United States Patent [19]

Kuwabara et al.

[11] Patent Number: 4,956,060
[45] Date of Patent: Sep. 11, 1990

[54] FINISHING METHOD EMPLOYING ELECTRO-CHEMICAL MACHINING, AND AN ELECTRO-CHEMICAL FINISHING MACHINE

[75] Inventors: Yohei Kuwabara, Fukuroi; Teruo Asaoka, Kakegawa; Shogo Yoshioka, Iwata; Haruki Sugiyama, Fukuroi, all of Japan

[73] Assignee: Shizuoka Seiki Co., Ltd., Shizuoka, Japan

[21] Appl. No.: 290,243

[22] Filed: Dec. 23, 1988

[30] Foreign Application Priority Data

Jan. 11, 1988 [JP] Japan ................................ 63-4040

[51] Int. Cl.⁵ .......................... B23H 3/02; B23H 9/12
[52] U.S. Cl. .......................... 204/129.2; 204/129.43; 204/129.5; 204/244 M; 204/225; 204/DIG. 9
[58] Field of Search ......... 204/129.2, 129.43, DIG. 9, 204/224 M, 228

[56] References Cited

U.S. PATENT DOCUMENTS

| | | | |
|---|---|---|---|
| 4,160,710 | 7/1979 | Greenwood | 204/DIG. 9 |
| 4,206,028 | 6/1980 | Inoue | 204/DIG. 9 |
| 4,800,006 | 1/1989 | Kuwabara et al. | 204/DIG. 9 |
| 4,842,702 | 6/1989 | Kuwabara et al. | 204/DIG. 9 |

FOREIGN PATENT DOCUMENTS 60-44228 3/1985 Japan.
61-71921 4/1986 Japan.

Primary Examiner—Donald R. Valentine
Attorney, Agent, or Firm—Flynn, Thiel, Boutell & Tanis

[57] ABSTRACT

A method and apparatus for electro-chemical machining involve: supplying a pulse having a predetermined current density between an electrode and an object to be worked while they face each other with a static electrolyte therebetween; detecting the current of the pulse supplied between the electrode and the object to be worked; comparing the detected current with a reference current set in accordance with factors such as properties of the object to be worked, and increasing the current density of the pulse on the basis of the result of the comparison; supplying pulses having the increased current density between the electrode and the object to be worked a predetermined number of times; and removing electrolytic products generated between the electrode and the object to be worked.

10 Claims, 7 Drawing Sheets

FINISHING METHOD EMPLOYING ELECTRO-CHEMICAL MACHINING, AND AN ELECTRO-CHEMICAL FINISHING MACHINE

FIELD OF THE INVENTION

The present invention relates to a finishing method employing electro-chemical machining and to an electro-chemical finishing machine, and more particularly to a finishing method employing electro-chemical machining and to an electro-chemical finishing machine which are capable of finishing a three-dimensional surface to be worked in a short period of time and with a high degree of accuracy so as to provide a surface having a specular gloss.

BACKGROUND OF THE INVENTION

Conventional metal machining methods include electrolytic forming methods. In such electrolytic forming methods, the gap between an electrode and an object to be machined or worked is filled with an electrolyte containing sodium nitrite or sodium chloride and a d.c. current is caused to flow from the object to be worked to the electrode while the electrolyte is caused to flow at a high speed and while electrolytic products are being removed, thus allowing working to be conducted. The electrolytic products include metallic compounds, metallic ions and hydrogen gas dissolved in the electrolyte, and are removed because they act to inhibit a stable electrolytic action (see Japanese Patent Laid-Open Publication No. 61-71921 and Japanese Patent Laid-Open Publication No. 60-44228).

However, such an electrolytic forming method has a serious disadvantage as a means of working. More specifically, it involves the problem that when a three-dimensionally shaped object having a bottom (a three-dimensional recessed structure) is to be worked, even if the gap between the electrode and the object to be worked is kept constant, it is impossible to cause an electrolyte to flow in the gap at a uniform flow rate owing to changes in the resistance of electrolyte flowing in the gap, as determined by the position of the inlet for the electrolyte, the distance of the gap from the inlet, or the extent to which the surface to be worked on the object has a three-dimensional shape which is curved.

In consequence, the extent to which the electrolytic products generated in the gap can be removed differs according to where the removal site is positioned, and the progress of working hence differs also, making it difficult to accurately transfer the electrode to the object to be worked. Therefore, in order to finish the surface to be worked with a high degree of accuracy, another polishing process is necessary, making finishing of the surface to be worked a time-consuming and troublesome task.

Accordingly, in view of the above-described problems of the known systems, the present inventor developed a finishing method using electro-chemical machining, in which in a first stage of the finishing process pulses having a low current density are supplied between the electrode and the object to be worked while they are located in a static electrolyte so as to improve the surface roughness of the surface to be worked and pulses having a high current density are intermittently supplied therebetween so as to remove an oxide layer generated on the surface to be worked, and in which in a second stage of the finishing process pulses having a high current density are supplied so as to obtain a glossy surface (see Japanese Patent Application No. 62-117486).

However, in this finishing method employing electro-chemical machining, although pulses having a high current density are supplied for a constant period in the first stage of the finishing process so as to remove the oxide layer, the thickness of the oxide layer generated differs according to the shape of the object to be worked or the type of arrangement employed for removing the electrolytic product and it is therefore difficult to set the oxide layer removing pulse supplying period so as to obtain an optimum working condition. For example, if the supplying period is short and the switch-over to the pulses having a high current density is effected early, the improvement of the surface roughness takes longer, and a longer time is required for processing. On the other hand, if the supplying period is long and if the switch-over to the pulses having a high current density is delayed, an oxide layer having a large electric resistance grows partially on the surface to be worked, changing the density of the current and thereby varying the amount of working conducted per unit area, which leads to inaccuracy in the shape of the worked object as well as in the surface quality.

Further, the timing of the switch-over to the pulses having a high current density must be set in accordance with the shape of the object to be worked, the area to be worked, or the type of arrangement employed for removing the electrolytic products, and working efficiency is thereby reduced.

Accordingly, an object of the present invention is to provide a finishing method employing electro-chemical machining and an electro-chemical finishing machine which enable the timing of a switch-over to pulses having a high current density to be set to provide an optimum working condition and thereby improve working efficiency, and which enable an oxide layer generated on a three-dimensional surface of an object to be worked to be entirely removed so that a highly accurate surface quality (such as a surface having a specular gloss) can be obtained in a short period of time.

SUMMARY OF THE INVENTION

To this end, the present invention provides, in one of its aspects, a finishing method employing electro-chemical machining which comprises the steps of: supplying a pulse having a predetermined current density between an electrode and an object to be worked while they are provided so as to face each other with a static electrolyte therebetween; detecting the current of the pulse supplied between the electrode and the object to be worked; comparing the detected current with a current set in advance in accord with the properties of the object to be worked and increasing or decreasing the current density of the pulse on the basis of the result of the comparison; supplying pulses having the increased or decreased current density between the electrode and the object to be worked a predetermined number of times; and removing electrolytic products generated between the electrode and the object to be worked.

The present invention provides, in another of its aspects, an electro-chemical finishing machine which comprises a pulse supplying arrangement for supplying pulses having a predetermined current density between an object to be worked and an electrode which face each other with a static electrolyte therebetween; a detecting arrangement for detecting the current of the pulses supplied between the object to be worked and the electrode; and a control arrangement for setting a lower limit current using the current detected by the detecting arrangement at the initial stage of the processing and the properties of the object to be worked, comparing the current detected by the detecting arrangement during the working with the lower limit current, and controlling the pulse supplying arrangement on the basis of the result of the comparison so that the current density of the pulses increases or decreases.

In the present invention, a pulse having a predetermined current density is supplied between an electrode and an object to be worked while they face each other with a static electrolyte therebetween, and the current of the pulse supplied is detected. When the detected current decreases due to for example the generation of the oxide layer on the surface to be worked and becomes equal to or smaller than a predetermined current set in advance in accord with the current detected at the initial stage of the working and the properties of the object to be worked, the current density of the pulse supplied between the electrode and the object to be worked is automatically switched over to a higher value, and pulses having this higher current density are supplied a predetermined number of times so as to remove the oxide layer on the surface to be worked and thereby improve the roughness of the surface to be worked in a short period of time.

BRIEF DESCRIPTION OF THE DRAWINGS

A preferred embodiment of the present invention will be described below with reference to the accompanying drawings, in which.

DETAILED DESCRIPTION

Figure 1:
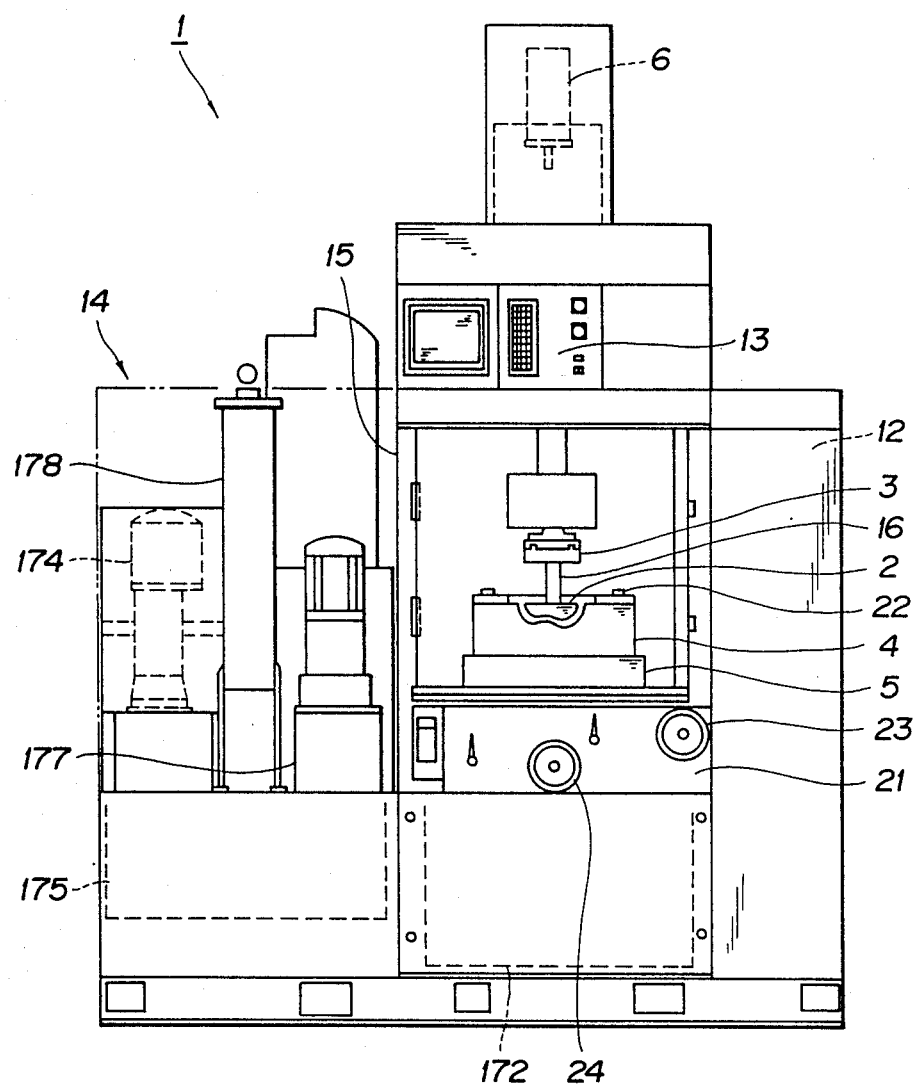
FIG. 1 is a front view of an electro-chemical finishing machine embodying the present invention.

In the drawings, reference numeral 1 designates an electro-chemical finishing machine, 2 an electrode, 4 an object to be worked, 8 a power source device, 9 a motor drive control section, 10 a working condition control section, 11 an electrolyte flow control section, 12 a control device, 13 an inputting device, 14 an electrolyte filtering device, 37 a current detecting unit, 38 a peak holding circuit, 44 a charging voltage setting section, and 46 a central processing unit.

Figure 2:
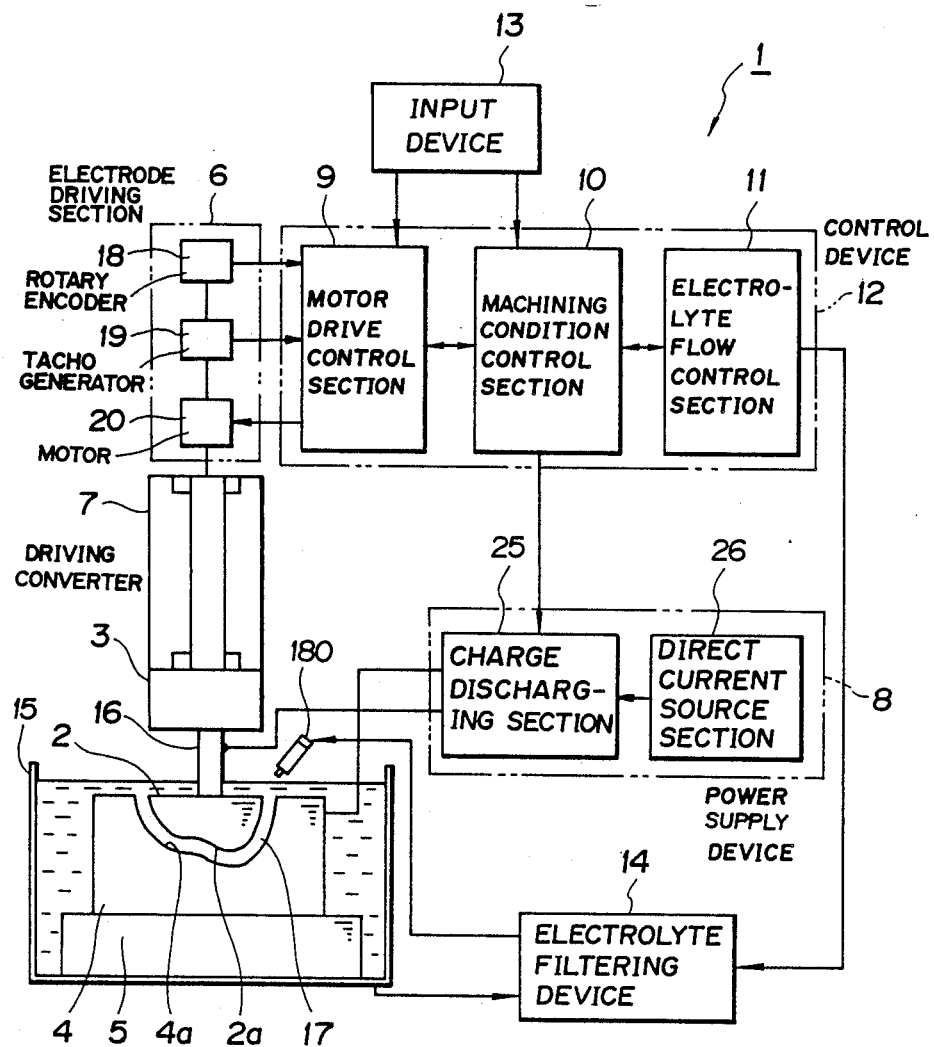
FIG. 2 is a block diagram of the electro-chemical finishing machine of FIG. 1.

Referring first to FIGS. 1 and 2, an electro-chemical finishing machine 1 includes an electrode fixing device 3 for supporting an electrode 2, a workpiece fixing device 5 for supporting a workpiece 4, a driving/converting section 7 for converting the rotary motion of an electrode driving section 6 into reciprocating motion, a power source device 8 for generating pulses, a control device 12 comprising a motor drive control section 9, a working or machining condition control section 10 and an electrolyte flow control section 11, an input device 13 for inputting various types of data regarding the workpiece 4, an electrolyte filtering device 14 for filtering an electrolyte, and a working or machining cell 15.

The electrode fixing device 3 is adapted to have the electrode 2, which is preferably made of pure copper or graphite, fixed to the lower end of a rod 16 provided at a lower portion thereof in a manner so that a constant gap 17 is formed between a three dimensional electrode surface 2a of the electrode 2 and a surface to be worked 4a of the workpiece 4. The electrode fixing device 3 is adjusted vertically by the electrode driving section 6 and the driving/converting section 7 so as to set the gap 17 to a predetermined value. More specifically, a motor 20 of the electrode driving section 6 is rotated by a control signal which is output from the motor drive control section 9 through a rotary encoder 18 and a tacho generator 19 of the electrode driving section 6, so as to move the electrode fixing device 3 vertically thereby setting the gap 17 between the electrode surface 2a and the surface to be worked 4a to a predetermined value.

The workpiece fixing device 5 is a table made of a highly insulating granite or ceramic. The workpiece fixing device 5 is fixed, together with the bottom plate of the working cell 15, by bolts to an X table (not shown) of an X - Y table 21 of the electro-chemical machine 1, and the workpiece 4 is fixed to the upper surface of the workpiece fixing device 5 by bolts 22, through which the workpiece 4, the workpiece fixing device 5 and the working cell 15 can be moved two-dimensionally in a body in X and Y directions by turning moving knobs 23 and 24 of the X - Y table.

Figure 3:
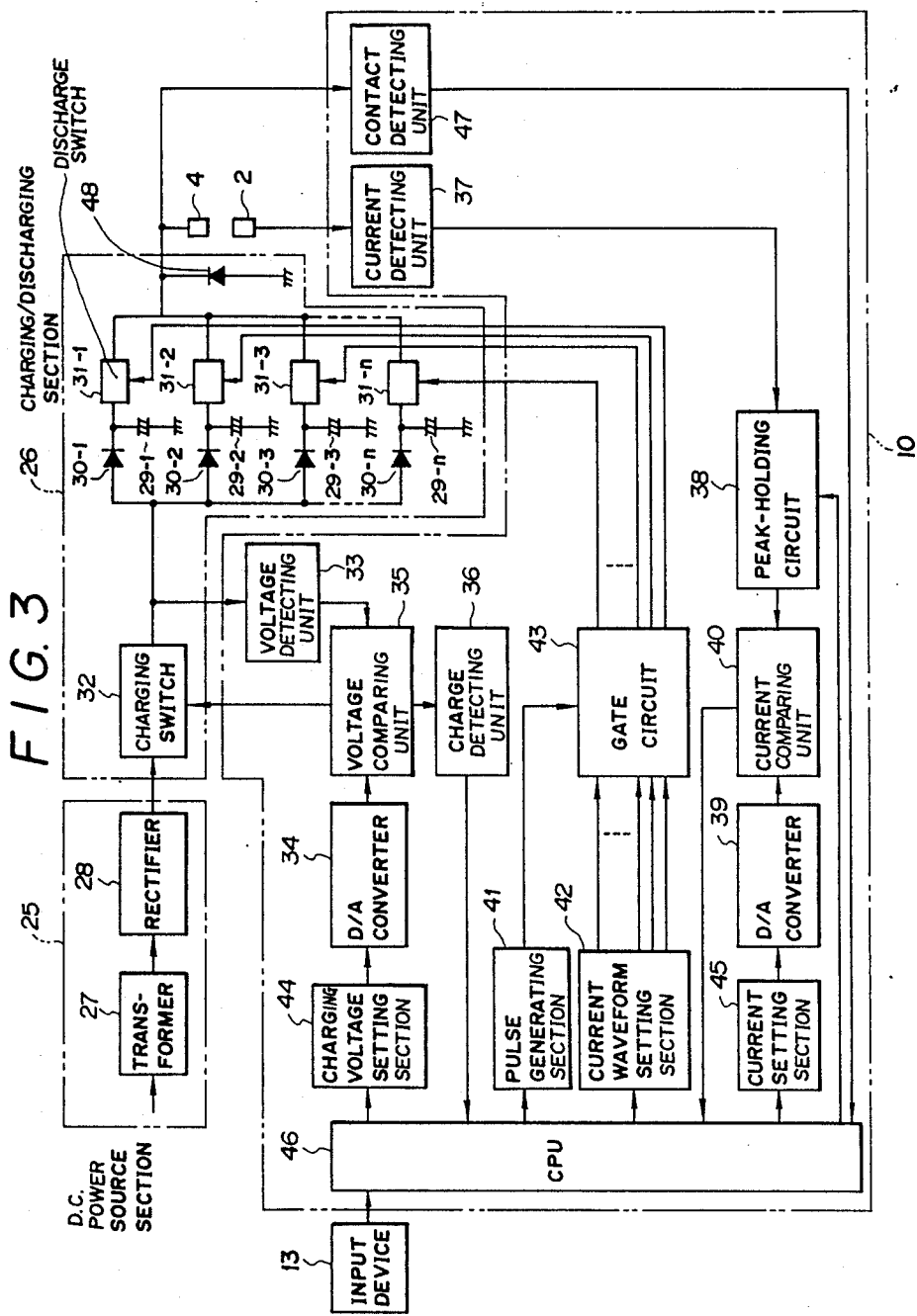
FIG. 3 is a block diagram of certain essential parts of the electro-chemical finishing machine of FIG. 1.
Figure 4:
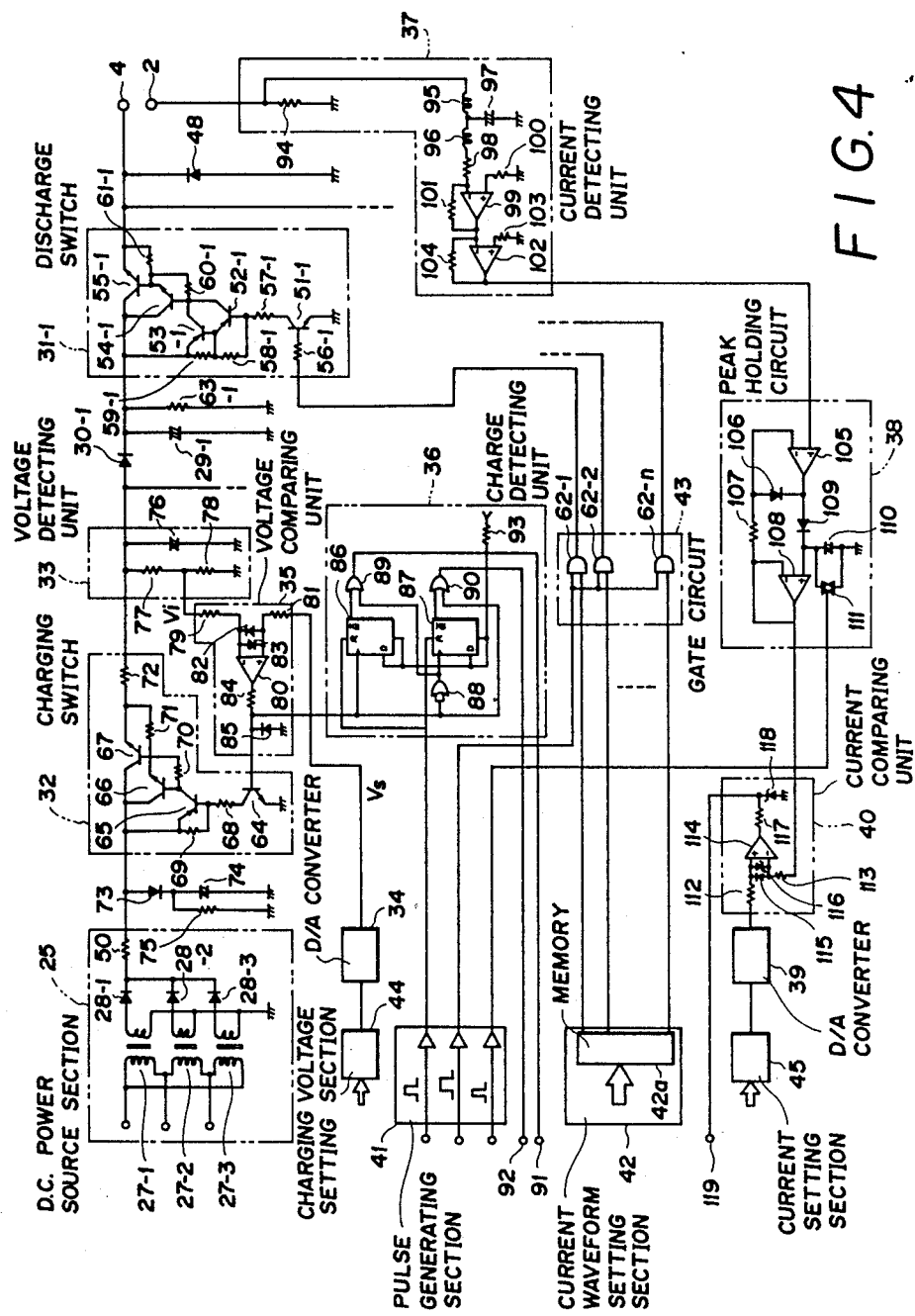
FIG. 4 is a schematic circuit diagram of certain essential parts of the system of FIG. 3.

The power source device 8 for supplying pulses having a predetermined peak current density between the electrode 2 and the workpiece 4 for a predetermined period of time and the working condition control section 10 in the control device 12 which controls the power source device 8 preferably have the structure shown in FIGS. 3 and 4.

More specifically, the power source device 8 comprises a d.c. power source section 25 and a charging/discharging section 26. The d.c. power source section 25 in turn includes a transformer 27 and a rectifier 28. An incoming d.c. voltage is lowered to a predetermined value by the transformer 27, and the current is then rectified by the rectifier 28 so as to obtain a d.c. current supplied to capacitors 29-1 to 29-n which are to be described later.

The charging/discharging section 26 in turn includes a plurality of capacitors 29-1 to 29-n for discharging electric charges between the electrode 2 and the workpiece 4, diodes 30-1 to 30-n respectively connected to the capacitors 29-1 to 29-n for blocking a reverse flow of electric charge to the d.c. power source device 25, discharging switches 31-I to 31-n which are selectively opened or closed for the discharge, and a charging switch 32 for connecting or disconnecting the capacitors 29-1 to 29-n to and from the d.c. power source section 25 so as to charge the capacitors 29-1 to 29-n to a predetermined value.

The working condition control section 10 for controlling the charging/discharging section 26 comprises a voltage detecting unit 33 for detecting the voltage of the capacitors 29-1 to 29-n, a voltage comparing unit 35 for comparing the voltage detected by the voltage detecting unit 33 with an output from a D/A (digital to analog) converter 34, a charge detecting unit 36 for detecting completion and start of charging of the capacitors 29-1 to 29-n based on the output signal from the voltage comparing unit 35, a current detecting unit 37 for detecting the current of electric charge discharged between the electrode and workpiece, a peak holding circuit 38 for holding the peak value of the current detected by the current detecting unit 37, a current comparing unit 40 for comparing the peak current value held by the peak holding circuit 38 with an output of a D/A (digital to analog) converter 39, a pulse generating section 41 for generating pulses having a predetermined length, a gate circuit 43 for outputting a respective drive or control signal to each of the discharging switches 31-1 to 31 n in response to respective signals output from a current waveform setting section 42 for setting the waveform of electric charges discharged between the electrode and workpiece, a charging voltage setting section 44 for setting the voltage supplied to the capacitors 29-1 to 29-n by outputting a setting signal to the D/A converter 34, a current setting section 45 for setting a current that flows between the electrode and the workpiece by outputting a setting signal to the D/A converter 39, a central processing unit (CPU) 46 for processing working conditions on the basis of data input through the inputting device 13, and a contact detecting unit 47 for detecting physical contact between the electrode 2 and workpiece 4. Reference numeral 48 denotes a diode for preventing damage to the discharging switches 31-1 to 31-n which would otherwise occur when the discharging switches 31-1 to 31-n are open, due to the counter electromotive force.

Now, control performed by the central processing unit 46 to charge and discharge the capacitors 29-1 to 29-n will be described. First, the central processing unit 46 calculates a charging voltage which ensures that the pulses supplied have a predetermined current density, by using a predetermined characteristic table stored in a memory in advance, and by using as input data a working area S of the workpiece 4 and a time during which a single pulse is to be on (hereinafter referred to as a pulse length) which are input beforehand by the inputting device 13, the unit 47 outputting the calculated charging voltage to the charging voltage setting section 44 of the working condition control section 10 The value of the charging voltage is calculated with the following equation, for example:

$$V = V_0 + (K1 \times \delta \times I) + (K2 \times I \times S)$$

where
V is the value of the charging voltage
$V_0$ is a constant voltage,
K1 and K2 are constants,
$\delta$ is an electrode gap,
I is a current density, and
S is the working area.

When the capacitors 29-1 to 29-n are charged to the predetermined voltage, a charging completion signal is sent to the central processing unit 46 from the charging detecting unit 36. In response to receiving this signal, the central processing unit 46 outputs control signals to the pulse generating section 41 and to the current waveform setting section 42 so as to turn on the gate circuit 43 which in turn actuates on or more of the discharging switches 31-1 to 31-n thereby supplying pulses having a predetermined current between the electrode and workpiece as first working pulses. The current of these pulses is detected by the current detecting unit 37, and the peak value of that current is held by the peak holding circuit 38. The peak value held and an analog signal obtained from the D/A converter 39 through converting a digital signal from the current setting section 45 are compared by the current comparing unit 40, and the result of this comparison is input to the central processing unit 46. These two values are compared by the current comparing unit 40 in the following manner: the count of a counter (not shown) in the current setting section 45 is incremented, starting from zero, and when an analog value obtained by having the count of the counter converted by the D/A converter 39 exceeds the peak value held by the peak holding circuit 38, the output of the current comparing unit 40 is inverted, and the amount of the counter at the time of such inversion is stored in the central processing unit 46 as the peak current.

On the basis of the stored peak current, the central processing unit 46 corrects the voltage set in the charging voltage setting section 44 (for example, the central processing unit increases the voltage set when the peak current stored is smaller than the current set in the current setting section 45, and decreases the voltage set when the peak current is larger than the set current), and at the same time calculates a lower limit current by multiplying the peak current by a constant determined in accordance with the properties of the workpiece 4 (including the material and working area S thereof) and sets it in the current setting section 45.

Subsequently, pulses having a predetermined peak current density are supplied between the electrode and the workpiece from the capacitors 29-1 to 29-n charged on the basis of the corrected voltage. Thereafter, the current is detected by the current detecting unit 37, and the peak value of the detected current is held by the peak holding circuit 38. The peak value is compared with the lower limit current set in the current setting section 45 by the current comparing unit 40, and a signal is output to the central processing unit 46 when the peak value becomes smaller than the lower limit current. In response to receiving the signal from the current comparing unit 40, the central processing unit 46 increases the voltage set in the charging voltage setting section 44 to one which provides pulses having a high current density.

FIG. 4 is a detailed circuit diagram which is a concrete example of the block diagram shown in FIG. 3, in which the same numbers are used to designate the same parts.

In the d.c. power source section 25 shown in FIG. 4, the incoming voltage is caused to drop to a predetermined value by coils 27-1 to 27-3 of the transformer 27, and the current is then rectified by diodes 28-1 to 28-3. The thus-obtained d.c. power is output through a resistor 50.

The discharging switch 31-1 (since the discharging switches 31-1 to 31-n have the same structure, only the discharging switch 31-1 will be described) comprises five transistors 51-1 to 55-1, and six resistors 56-1 to 61-1. The transistors 51-1 to 55-1 are sequentially turned on by drive signals output from an AND gate 62-1 of the gate circuit 43 so as to discharge the capacitor 29-1. A resistor 63-1 is connected in parallel to the capacitor 29-1.

The charging switch 32 comprises four transistors 64 to 67, and five resistors 68 to 72. The set voltage value $V_s$ which is output from the D/A converter 34 and the charging voltage $V_i$ detected by the voltage detecting unit 33 are compared by the voltage comparing unit 35, and the transistors 64 to 67 are turned on and off by the output of the voltage comparing unit 35 so as to selectively connect and disconnect the d.c. power source section 25 to and from the capacitors 29-1 to 29-n. For the purpose of protecting the charging switch 32, a diode 73 has a first end connected between the d.c. power source section 25 and the charging switch 32, and is grounded at a second end thereof through a capacitor 74 and a resistor 75.

The voltage detecting unit 33 includes a capacitor 76 which is grounded at one end thereof, and two resistors 77 and 78 which are connected in series with each other and together are connected in parallel with the capacitor 76 for dividing the voltage. The output of the voltage detecting unit 33 is connected to a first input terminal of a comparator 80 of the voltage comparing unit 35 through a resistor 79. A second input terminal of the comparator 80 is connected to the output of the D/A converter 34 through a resistor 81. Diodes 82 and 83 are connected with opposite polarities between the inputs of the comparator 80. The output of the comparator 80 is connected to a resistor 84, which is in turn connected to one end of a diode 85 having its other end grounded, and to the base of the transistor 64 of the charging switch 32.

The charging detecting unit 36 comprises two flip-flops (each hereinafter abbreviated as FF) which are connected to the power source through a resistor 93, and three gates 88, 89 and 90. The output of the comparator 80 of the voltage comparing unit 35 provided through resistor 84 is connected to a trigger or clock terminal of the FF 86 and, through a gate 88, to a trigger or clock terminal of the FF 87. An output terminal of the FF 86 is connected through a gate 89 to a terminal 91 of the central processing unit 46, while an output terminal of the FF 87 is connected to a terminal 92 of the central processing unit 46 through a gate 90, so as to enable a charging start signal and a charging completion signal to be detected at the terminals 91 and 92, respectively.

The current detecting unit 37 includes a resistor 94 connected between ground and the electrode 2. The electrode side of the resistor 94 is connected to a noise cutting filter comprising two coils 95 and 96 and a capacitor 97, and then to a first input terminal of a comparator 99 through a resistor 98. A second input terminal of the comparator 99 is grounded through a resistor 100. The output of the comparator 99 is connected through a feedback resistor 101 to the first input terminal thereof, and is also connected to a first input terminal of an amplifier 102. A second input terminal of the amplifier 102 is grounded through a resistor 103, and the output thereof is connected through a feedback resistor 104 to the first input terminal thereof so as to enable the current of the discharge of be output.

The output of the amplifier 102 of the current detecting unit 37 is connected to a first input terminal of an amplifier 105 of the peak holding circuit 38. A second input terminal of the amplifier 105 is connected through a diode 106 to the output thereof, and is also connected through a resistor 107 to a first input terminal and an output terminal of an amplifier 108. The output terminal of the amplifier 105 is connected to a second input terminal of the amplifier 108 through a diode 109. The second input terminal of the amplifier 108 is grounded through a capacitor 110. An analog switch 111, which has a terminal connected to the pulse generating section 41, is connected across the capacitor 110.

The peak holding circuit 38 is adapted to hold (retain) the peak value of the current detected by the current detecting unit 37 and to output same to the current comparing unit 40. The peak holding circuit 38 is reset by a resetting pulse from the pulse generating section 41.

The output terminal of the D/A converter 39 and the output terminal of the peak holding circuit 38 are respectively connected through resistors 112 and 113 to respective input terminals of a comparator 114 of the current comparing unit 40. Diodes 115 and 116 are connected with opposite polarities between the inputs of the comparator 114. The output terminal of the comparator 114 is connected through a resistor 117 to one end of a diode 118 having its other end grounded, and to a terminal 119 of the central processing unit 46.

The AND gates 62-1 to 62-n of the gate circuit 43 each have a first input connected to a respective output of a temporary memory 42a of the current waveform setting section 42, and have second inputs which are all connected to an output terminal of the pulse generating section 41, by means of which the AND gates open and close the discharging switches 31-1 to 31-n based on signals from the temporary memory 42a and from the output terminal of the pulse generating section 41, to thereby control charging and discharging.

More specifically, when the capacitors 29-1 to 29-n are to be discharged, one or more of the AND gates 62-1 to 62-n are turned on by the on signal of a working instruction pulse from the pulse generating section 41 so as to selectively turn on corresponding transistors 51-1 to 51-n of the discharging switches 31-1 to 31-n and thereby discharge corresponding capacitors 291 to 29-n. When the discharge of the capacitors 29-1 to 29-n is to be stopped, the AND gates 62-1 to 62-n are turned off by the off signal of the working instruction pulse so as to turn off the transistors 51-1 to 51-n of the discharging switches 31-1 to 31-n and thereby stop the discharge of the capacitors 29-1 to 29-n.

Figure 5:
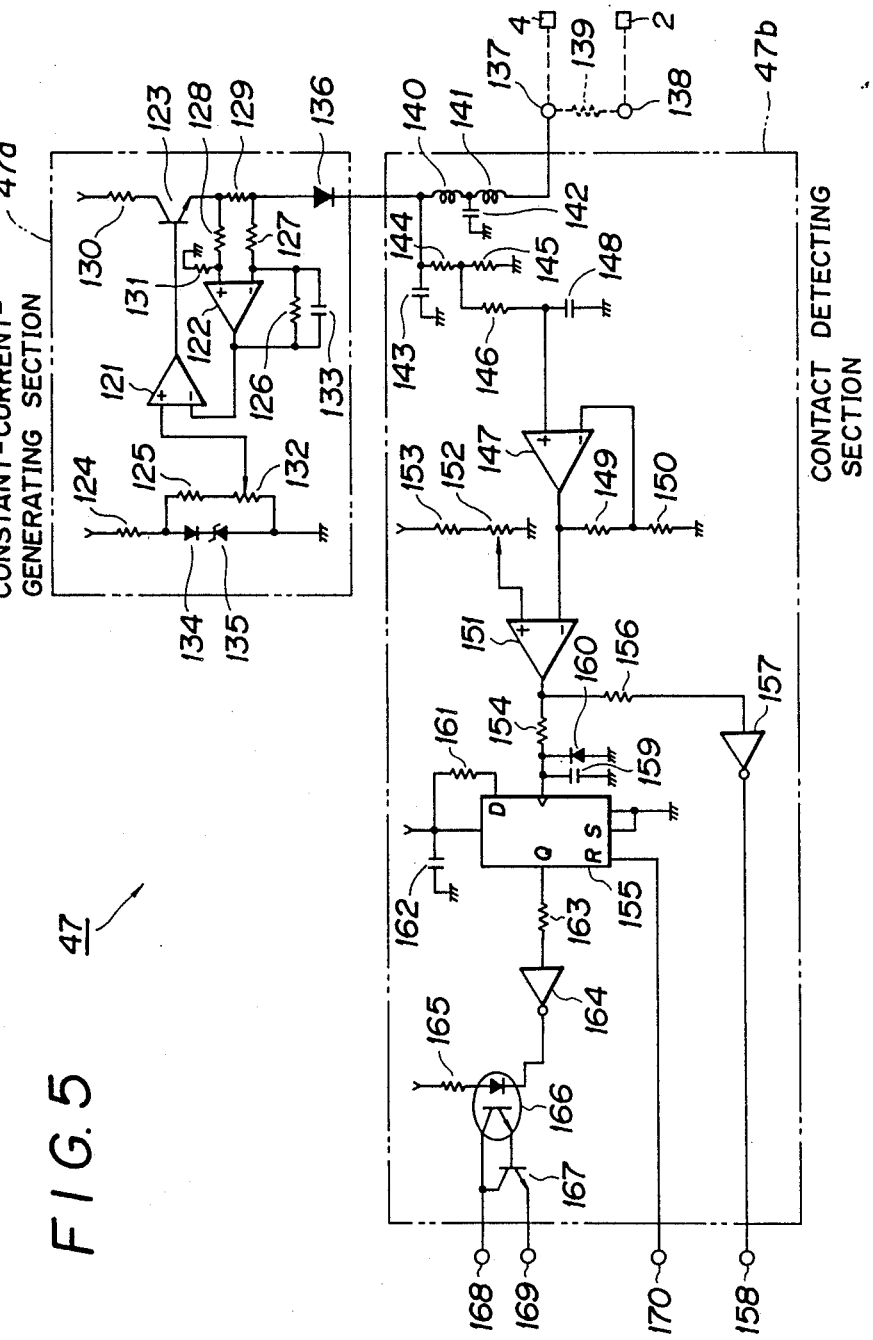
FIG. 5 is a schematic circuit diagram of a contact detecting unit which is a component of the system of FIG. 3.

As shown in FIG. 5, the contact detecting unit 47 comprises a constant-current-generating section 47a, and a contact detecting section 47b, as shown in FIG. 5. More specifically, the constant-current-generating section 47a includes two amplifiers 121 and 122, a transistor 123, eight resistors 124 to 131, a variable resistor 132, a capacitor 133, and three diodes 134 to 136 (of which diode 135 is a Zener diode). The contact detecting unit 47 is adapted to supply a constant current through a noise cutting filter which is to be described later to a resistor 139 (which may be a resistor having a low resistance of 3 ohms) between a terminal 137 connected to the object to be machined 4 and a terminal 138 connected to the electrode 2.

In the contact detecting section 47b, a capacitor 143 and a series combination of resistors 144 and 145 grounded at one end thereof are connected to one end of a coil 140 of the noise cutting filter, which includes the two coils 140 and 141 and a capacitor 142, so that the voltage divided by the series combination of resistors 144 and 145 is supplied to a first input terminal of an amplifier 147 through a resistor 146. This first input terminal of the amplifier 147 is coupled to ground through a capacitor 148. A second input terminal of the amplifier 147 is connected to the output terminal thereof through a resistor 149 and is coupled to ground through a resistor 150. The output terminal of the amplifier 147 is connected to a first input terminal of an amplifier 151 whose second input terminal is connected to the slider of a variable resistor 152, resistors 152 and 153 being connected in series between the power supply and ground.

An output terminal of the amplifier 151 is connected to a trigger or clock terminal of a FF 155 through a resistor 154 and to an input terminal of a gate 157 through a resistor 156. The output terminal of the gate 157 is connected to a buzzer terminal 158 that enables the generating of an alarm with a buzzer (not shown) when the electrode 2 makes contact with the object 4 to be machined. The trigger or clock terminal of the FF 155 is coupled to ground through a capacitor 159 and a diode 160. A D terminal of the FF 155 is connected to the power source through a resistor 161, and a capacitor is connected to the power source at one end and is grounded at the other end thereof. An output terminal of the FF 155 is connected through a resistor 163 to an input terminal of a gate 164. The output of the gate 164 is connected to a photocoupler 166 which is in turn connected to the power source through a resistor 165. The output of the photocoupler 166 is connected to a transistor 167 whose collector and emitter are respectively connected to terminals 168 and 169 of the central processing unit 46. A terminal 170 of the central processing unit 46 is used to reset the FF 155.

In the contact detecting unit 47, a constant current is supplied to the resistor 139 connected between the terminals 137 and 138 by the constant current generating section 47a, and an abnormal voltage is detected by the contact detecting section 47b so as to detect short-circuiting between the terminals 137 and 138 which may be caused by contact of the electrode 2 with the object 4 to be machined. A detection signal is output from the terminals 168 and 169 to the central processing unit 46, and at the same time is used to issue an alarm with a buzzer through the terminal 158.

The inputting unit 13 of the electro-chemical finishing machine 1 is adapted to accept input such as the material of the object to be machined, the area S to be worked, the amount of finish, the grade of a dimension accuracy, the pulse length of pulses to be supplied, the number of times pulses are supplied in one working (working for each pulse or every few pulses), and the working gap between the electrodes, and then outputs signals based on this data to the motor drive controlling section 9 and the working condition control section 10 of the control device 12.

Figure 6:
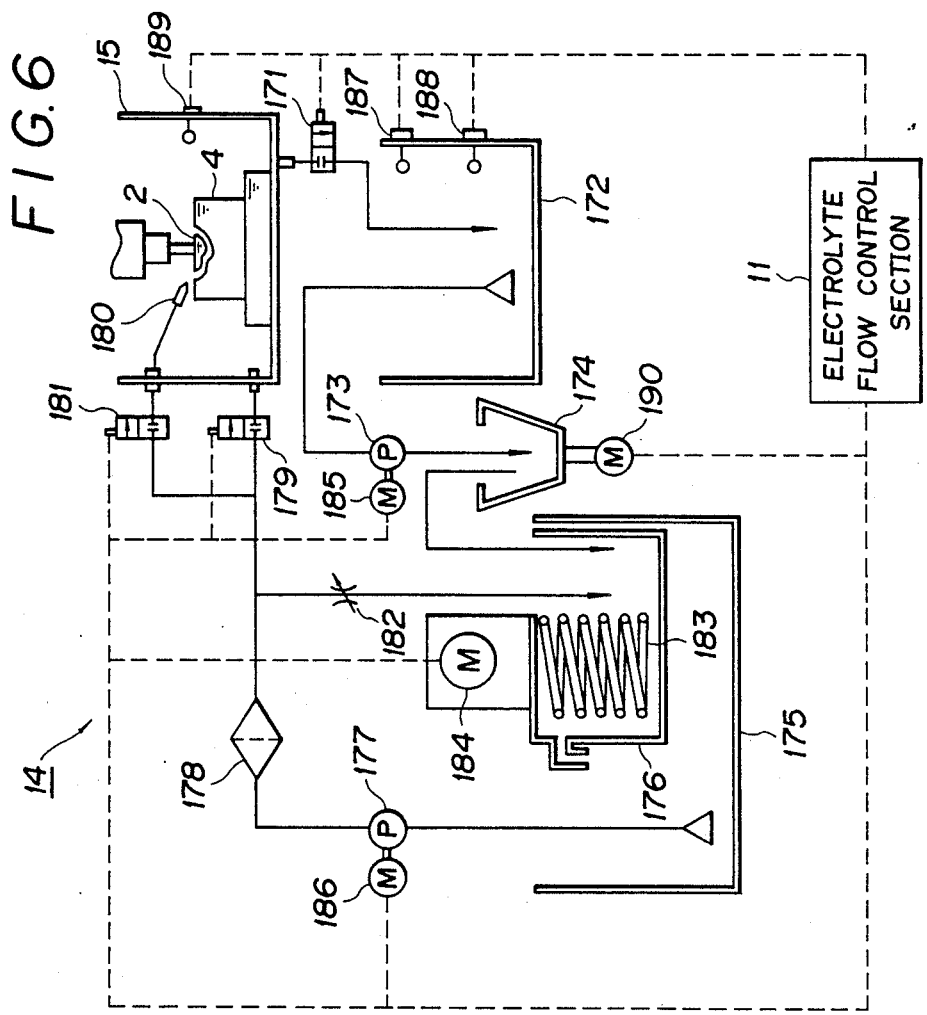
FIG. 6 is a diagrammatic view of an electrolytic filtering arrangement which is part of the machine of FIG. 1.

The electrolyte filtering device 14 which is adapted to filter the electrolyte containing electrolytic products generated during the working has the structure shown in FIG. 6. More specifically, the electrolyte filtering device 14 includes a dirty tank 172 for receiving through a solenoid valve 171 electrolyte which is from the working cell 15 and contains a large amount of electrolytic products, a centrifugal separator 174 for centrifugally separating products from the electrolyte pumped into it through an electromagnetic pump 173 from the dirty tank 172, a clean tank 175 for storing electrolyte which has been processed by the centrifugal separator 174 and therefore does not contain electrolytic products, a liquid temperature adjusting device 176 provided in the clean tank 175, the liquid temperature adjusting device comprising a heater 183 and a fan (not shown) rotated by a motor 184, an electromagnetic pump 177 for pumping electrolyte from the clean tank 175, a solenoid valve 179 that enables a selective supply of the pumped electrolyte to the working cell 15 through a filter 178, a solenoid valve 181 which enables ejection of electrolyte which has passed through the filter 178 into the working gap between the electrode 2 and the object 4 to be machined through a nozzle 180 so as to flush electrolyte products from the gap, and a throttle valve 182 for returning electrolyte which has passed through the filter 178 to the liquid temperature adjusting device 175.

The electrolyte filtering device 14 also includes a drive motor 185 for driving the electromagnetic pump 173, a drive motor 186 for driving the electromagnetic pump 177, an upper limit float switch 187 and a lower limit float switch 188 for detecting the level of the electrolyte in the dirty tank 172, a float switch 189 for detecting the level of electrolyte in the working cell 15, and a motor 190 for driving the centrifugal separator 174.

The electrolyte flow control section 11 for controlling the electrolyte filtering device 14 controls the solenoid valves 179 and 181 and the electromagnetic pumps 173 and 177, on the basis of the control signal from the working condition control section 10, such that electrolyte is supplied to the working cell 15 and clean electrolyte (whose temperature has been adjusted and which has passed through the filter 178) is ejected through nozzle 180 into the working gap between the electrode 2 and the object 4 to be machined so as to remove from the gap electrolytic products generated between the electrode surface 2a and the surface 4a to be machined during working. The control of the electrolyte flow control section 11 will be described in detail below.

The electrolyte in the working cell 15 which contains electrolytic products is discharged into the dirty tank 172 by actuation of the solenoid valve 171, which responds to a signal from the electrolyte flow control section 11. The level of electrolyte contained in the dirty tank 172 is detected by the upper and lower float switches 187 and 188, the detection signals being input to the electrolyte flow control section 11. The electrolyte flow control section 11 outputs a drive signal to the drive motor 185 for the electromagnetic pump 173 when the electrolyte contained in the dirty tank 172 reaches a predetermined level, i.e., when the level is between the upper and lower float switches 187 and 188, so as to pump electrolyte from the dirty tank 172 into the centrifugal separator 174.

A motor 190 of the centrifugal separator 174 is rotated by a control signal from the electrolyte flow control section 11 so as to separate products from the electrolyte. The separated electrolyte, which does not contain electrolytic products, is stored in the tank 175 having the liquid temperature adjusting device 176, where the temperature thereof is adjusted to a standard value. At this time, when the temperature of the electrolyte separated by the centrifugal separator is below the standard value, the heater 183 is energized by the control signal from the electrolytic flow control section 11 so as to heat the electrolyte. On the other hand, when the temperature of the electrolyte is above the standard value, the motor 184 is rotated by a control signal from the electrolytic flow control section 11 so that the not-illustrated fan driven by its cools the electrolyte, thus making it possible for the electrolyte to be kept at a constant temperature.

The electrolyte whose temperature has been adjusted is stored in the clean tank 175. When working is started, the electrolyte is pumped out of the clean tank 175 by the electromagnetic pump 177, passes through the filter 178, then through the solenoid vale 179 actuated by the control signal from the electrolyte flow control section 11, and is supplied into the working cell 15. During the working, electrolyte passes through the solenoid valve 181, which is intermittently actuated by a control signal from the electrolyte flow control section 11 when the electrode 2 is raised one or more times, and is ejected into the working gap between the electrode 2 and the object to be machined through the nozzle 180 so as to remove electrolytic products from the gap. Since the electromagnetic pump 177 is kept operating during the working so as to pump electrolyte from the clean tank 175, electrolyte which is pumped while the solenoid valve 181 is not actuated is returned to the liquid temperature adjusting device 176 through the throttle valve 182.

The electrolyte supplying system is not limited to the above-described embodiment. For example, a series combination of first and second fluid cylinders may also be employed to supply the electrolyte. In that case, the first cylinder is provided with a pair of check valves for preventing electrolyte from flowing back to the working cell 15 and the clean tank 175, respectively, and a compressor is connected through a control valve to the second cylinder to operate it. The operation of the second cylinder causes the first cylinder to operate, by which electrolyte is drawn into the first cylinder and then is ejected from it into the gap between the electrode 2 and the object 4 to be worked.

Figure 7:
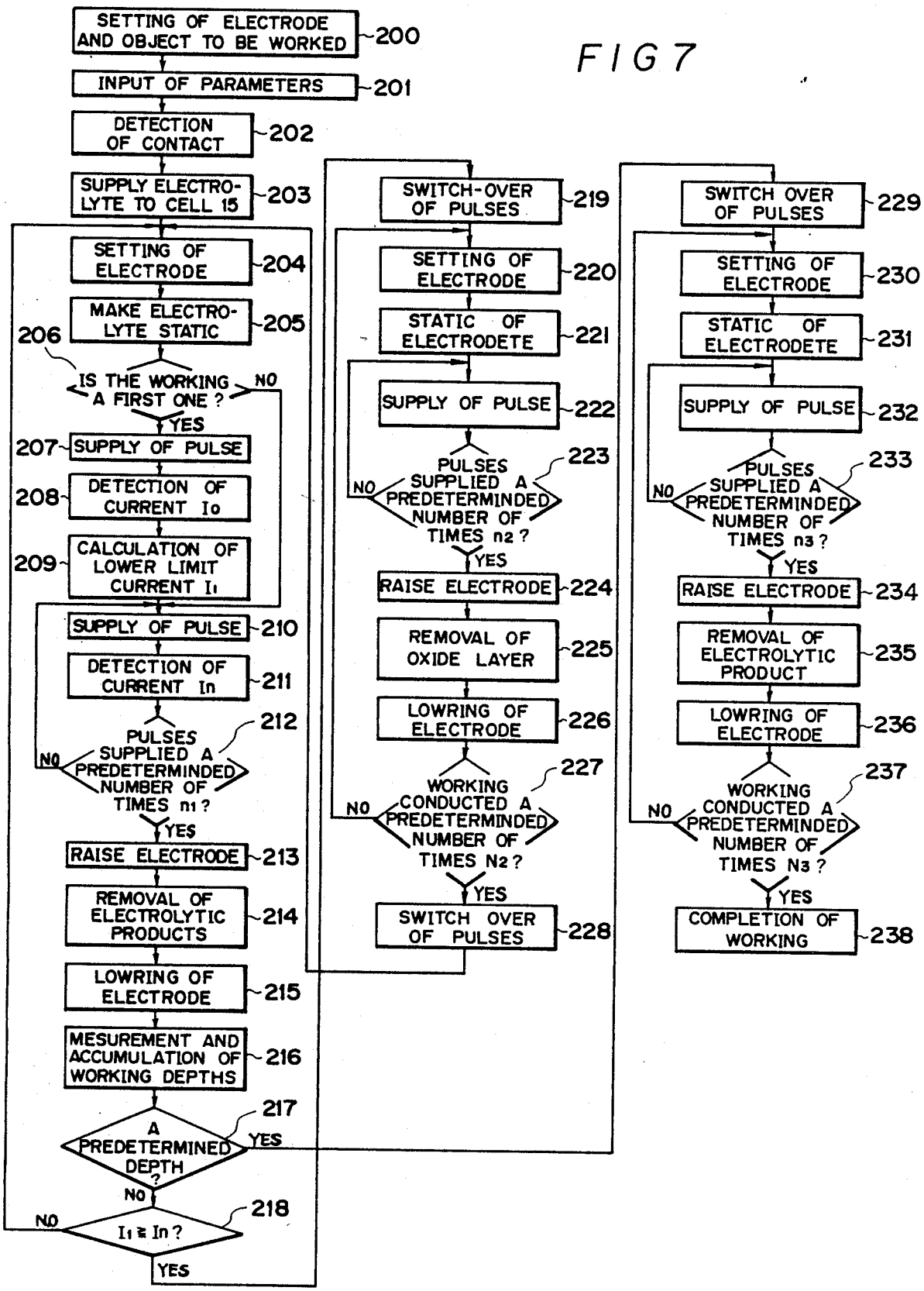
FIG. 7 is a flowchart of a finishing operation conducted by the machine of FIG. 1.

The finishing operation performed by the electrochemical finishing machine 1 will be described below with reference to the flowchart in FIG. 7.

First, the electrode 2 employed when the object to be worked is formed with electric sparks, or the remaining of wire cut electric spark forming, is fixed as the electrode 2 to the rod 16 of the electrode fixing device 3, whereas the object to be worked 4 is mounted on the workpiece fixing device 5 (step 200). Next, various parameters, including the working area S of the object 4 to be worked, the pulse lengths $ton_1$ to $ton_3$ of the pulses to be supplied, the number of times $n_1$ to $n_3$ pulses are to be supplied, the number of times $N_2$ and $N_3$ the working is to be conducted, and the working gap $\delta$ between the electrodes, are input using the inputting device 13 (step 201). Thereafter, the electrode 2 is lowered so that the electrode surface 2a makes contact with the surface 4a to be worked (step 202), and the position of the lowered electrode 2 is detected by the contact detecting unit 47 to represent an origin point A.

Subsequently, electrolyte is supplied from the clean tank 175 to the working cell 15 by actuating the solenoid valve 179 (step 203). Once the float switch 189 is activated, the electrode 2 is raised and is set to a position at which an initial electrode gap $\delta$ is formed (step 204). As the flow of electrolyte into the gap between the electrode surface 2a and the surface 4a to be worked becomes static, or in other words as the flow or movement of the electrolyte becomes substantially stopped (step 205), it is determined whether or not the working is the first working (step 206). If the answer is YES, that is if the working is the first one, a pulse having a predetermined peak current density $ip_1$ and a pulse length $ton_1$ which correspond to the working area S of the object to be worked 4 (hereinafter referred to as a first pulse) is supplied between the electrode 2 and the object 4 to be worked from the power supply device 8 due to a control signal from the working condition control section 10 (step 207).

When the pulse is supplied between the electrode 2 and the object 4 to be worked, the current $I_0$ which flows between the electrode 2 and the object 4 to be worked is detected by the current detecting unit 37 (step 208), and the peak value of the detected current is held by the peak holding circuit 38. The central processing unit 46 then calculates a lower limit current $I_1$ using this peak value and the parameters representing the properties of the object 4 to be worked (step 209, and stores it in the current setting section 45. Here, the lower limit current value I1 is obtained through the following steps: 1. The total current I through the gap is obtained from the working area S and a peak current density ipl commensurate with the working area. 2 The lower limit current value I1 is then obtained as I1-=I×K3, where K3 is a constant not larger than 1. Next, the central processing unit supplies a pulse which is the same as the first pulse between the electrode 2 and the object 4 to be worked (step 210), and detects a current $I_n$ that flows between the electrode 2 and the object to be worked 4 at this time(step 211). Subsequently, the central processing unit repeats the processing in steps 210 and 211 a predetermined number of times $n_1$ (step 212). It has been experimentally confirmed that the roughness of the surface 4a to be worked having an area ranging between 1 cm$^2$ and 300 cm$^2$ could be improved when a pulse having a peak current density $ip_1$ ranging from 15A/cm$^2$ to 100A/cm$^2$ and a pulse length $ton_1$ ranging from 4 msec to 100 msec is employed as the first pulse.

Once the first pulses have been supplied the predetermined number $n_1$ of times in step 212, the motor 20 is driven by a signal from the motor drive control section 9 so as to raise the electrode 2 (step 213), and the electrode surface 2a is separated from the surface 4a to be worked so that electrolytic products dissolved in the electrolyte in the gap between the electrode surface 2a and the object 4a to be worked are discharged together with the electrolyte by the ejection of electrolyte though the nozzle 180, which is achieved by actuation of the solenoid valve 181 of the electrolyte filtering device 14 (step 214).

After the electrolytic products have been discharged, the electrode 2 is lowered until the electrode surface 2a makes contact with the surface 4a to be worked (step 215), and the position of the lowered electrode 2 is detected by the contact detecting unit 47. Thereafter, the detected position is compared with the previously detected original point A by the central processing unit 46 so as to measure the depth worked in one working, and the measured depth is added to an accumulation which is initially zero (step 216). The accumulated value is then compared with a previously set value (step 217). If the difference between the accumulated value and the set value is larger than a predetermined difference value (for example 1 $\mu$m), it is determined whether or not the current $I_n$ detected in step 211 is equal to or smaller than the lower limit current $I_1$ calculated in step 209 (step 218). If $I_n > I_1$ (if the answer is NO), the flow returns to step 204. Subsequently, the judgement made in step 206 becomes negative, and the flow jumps from step 206 to step 210.

On the other hand, if the answer in step 218 is affirmative, that is if the detected current $I_n$ is equal to or smaller than the lower limit current $I_1$, a signal is output from the current comparing unit 40 to the central processing unit 46, by means of which the central processing unit 46 outputs a control signal to the charging voltage setting section 44 and the current waveform setting section 42 so as to switch the pulses supplied from the power source device 8 to those having a predetermined peak current density $ip_2$ and a predetermined pulse length $ton_2$ which correspond to the area S to be worked (step 219), and moves up electrode 2 and sets it at the same position at which it was set in step 204 (step 220). In this case, the gap between the electrode 2 and the object 4 to be worked increases as the working progresses. Once the electrolyte between the electrode surface 2a and the object 4a to be worked becomes static (step 221), the second type of pulse is supplied between the electrode 2 and the object 4 to be worked (step 222) so as to remove the oxide layer generated on the surface 2a in at least one working therefrom. Pulses having a peak current density which is 5 to 10 A/cm² higher than that of the first pulses and a pulse length which is 10 to 15 msec larger than that of the first pulses may be employed as optimum second pulses.

Once the second pulses have been supplied a predetermined number of times $n_2$ and the oxide layer has been thereby removed from the surface 4a to be worked (step 223), the electrode 2 is raised (step 224), and the electrolyte containing the removed oxide layer is then discharged from the gap 17 by operation of the solenoid valve 181 (step 225). Once the oxide-containing electrolyte is discharged from the gap, the electrode 2 is lowered (step 226), and it is then determined whether or not the working has been conducted a predetermined number of times $N_2$ (step 227). If the answer is NO, the flow returns to step 220, and steps 220–227 are repeated until working with the second pulses has been conducted a predetermined number of times $N_2$. On the other hand, if the answer is YES in step 227, pulses supplied from the power source device 8 are switched over to the first pulses (step 228), and the flow then returns to step 204.

Once the difference between the accumulated value of the depths worked in the series of workings and the set value becomes a predetermined value or less, the answer in step 217 becomes affirmative, and the pulses supplied from the power source device 8 by the control signal from the working condition control section 10 are switched over (step 229) to those having a predetermined peak current density $ip_3$ and a predetermined pulse length $ton_3$ (hereinafter referred to as third pulses). Thereafter, working consisting of the same basic processing as in steps 220 to 227 is repeated a predetermined number of times $N_3$ (steps 230 to 237), and the finishing working is completed (step 238). Pulses having a peak current density of $iP_3$ ranging from 30 A/cm² to 50 A/cm² and a pulse length ranging from 20 msec to 60 msec may be employed as optimum third pulses.

The timing at which the switch-over of the pulse is conducted in step 217 need not be detected on the basis of the result of a comparison of the accumulated value of the working depths with a set value, but can be detected on the basis of the quantity of electricity per unit area calculated from the start of working to the completion thereof.

In the above-described embodiment, after the pulses having a predetermined value have been supplied, the electrode 2 is raised so as to enable electrolytic products to be removed. However, if the electrode 2 has provided in it at least one electrolyte ejecting or sucking hole, the electrolyte may be ejected from the ejecting hole or sucked into the sucking hole by a suitable pressure or vacuum arrangement while the electrode 2 remains at the position at which the initial electrode gap is formed, so as to remove the electrolytic products.

Further, in the above-described embodiment, the working area of the object 4 to be worked is input using the inputting device 13. However, it may also be automatically calculated by the central processing unit 46 using a peak current value detected when a reference voltage is supplied between the electrode and the object to be worked, as well as a conversion equation experimentally obtained in advance.

Next, examples of finishing conducted using the inventive finishing method employing electro-chemical machining and using the inventive electro-chemical finishing machine will be described below.

EXAMPLE 1

Electrode: pure copper
Material of the object to be worked: tool steel
Surface area of the surface to be worked: 25 cm²
Electrode gap: 0.1 mm
Electrolyte: sodium nitride solution
(having a concentration of 40%)
First pulses:
Peak current density: 15A/cm²
Pulse length: 4 msec
Second pulses:
Peak current density: 25A/cm²
Pulse length: 20 msec
Third pulses:
Peak current density: 48A/cm²
Pulse length: 40 msec
Finishing surface roughness: Rmax: 1 μm or less
Finishing surface: surface having a specular gloss

EXAMPLE 2

Electrode: pure copper
Material of the object to be worked: tool steel
Surface area of the surface to be worked: 1 cm²
Electrode gap: 0.1 mm Electrolyte: sodium nitride solution (having a concentration of 40%)
First pulses:
Peak current density: 60A/cm²
Pulse length: 5 msec
Second pulses:
Peak current density (65A/cm²
Pulse length: 15 msec
Third pulses:
Peak current density: 48A/cm²
Pulse length: 40 msec
Finishing surface roughness: Rmax: 1 μm or less
Finishing surface: surface having a specular gloss Thus, in the finishing method employing electro-chemical machining and the electro-chemical finishing machine 1 according to the present invention, switch-over to the oxide layer removing pulses having a high current density is conducted when a drop in the current (caused by the generation of the oxide layer) is detected. In consequence, pulses can be switched over in a state where the extent to which the oxide layer is generated is always the same, regardless of the shape of the object to be worked or the working area, and the oxide layer generated on the surface 4a to be worked can be thereby removed without fail so as to enable the surface roughness to be improved in a short period of time. In addition, it was confirmed through experiments that the current drop owing to the generation of the oxide layer was substantially proportional to a value obtained by multiplying 0.2 by the area to be worked.

In the above-described embodiment, the case is described where the current density of the pulse current is increased when the current value flowing through the gap decreases to a value not larger than the calculated lower limit current value. It goes without saying, however, that the above description does not limit the spirit of the present invention but that the present invention is also applicable to the case, like the 2nd and 3rd pulses of the above-described processing example, where the current density decreases. Further ... in the above-described embodiment, a peak current density is used as the current density. However, the current density may also be an average current density. Further, the application field of the present invention is not limited to a die machining, but the present invention can also be applied to finishing in which a slight amount of internal stress imparted to the surface by the working causes a problem, including the finishing of a substrate made of silicon single crystal or gallium arsenide in the manufacture of a semiconductor device and the working of a specular surface of an aluminum disk in a magnetic recording device by a single crystal diamond. When combined with an automatic conveying device, the present invention can also be applied to the finishing of a mass produced hypoid gear which is conducted after heat treatment.

As will be understood from the foregoing description, in the finishing method employing electro-chemical machining and in the electro-chemical finishing machine according to the present invention, the current of a pulse which has a predetermined current density and which is supplied between the electrodes is measured, and a lower limit current is calculated from the current measured at the initial stage of the working and the properties of the object to be worked. When the measured current becomes equal to or smaller than the lower limit current, for example the current density of the pulses is switched over to a high value. In consequence, switch-over to the pulses having a high current density can be conducted in a state where the extent to which the oxide layer is generated during the working is always the same, and the oxide layer generated on the surface 4a to be worked can be thereby removed without fail so as to enable the surface roughness to be improved in a short period of time and a specular, glossy surface to be easily provided.

Further, since switch-over of the current density is automatically conducted regardless of the shape of the object to be worked or the area to be worked, the working efficiency is increased.

We claim:

1. A finishing method employing electro-chemical machining, comprising the steps of:
   A. supplying a pulse having a selected current density between an electrode and an object to be worked, said electrode and object having thereon respective three-dimensional surfaces of substantially congruent shape which face each other, which are spaced by a substantially uniform interval at all locations thereon, and which have a static electrolyte therebetween;
   B. detecting the current of the pulse supplied between said electrode and said object to be worked, and then effecting relative movement of said electrode and said object away from each other, injecting electrolyte between said electrode and said object, and then positioning said electrode relative to said object so that said three-dimensional surfaces have said uniform interval therebetween;
   C. comparing the detected current with a current set in advance in accordance with properties of said object to be worked, and increasing or decreasing said selected current density on the basis of the result of said comparison;
   D. supplying pulses having said increased or decreased selected current density between said electrode and said object to be worked a predetermined number of times;
   E. effecting relative movement of said electrode and said object away from each other, removing electrolytic products generated between said electrode and said object to be worked by injecting electrolyte between said electrode and said object, and then positioning said electrode relative to said object so that said three-dimensional surfaces have said uniform interval therebetween; and
   F. repeating said steps A through E.

2. An electro-chemical finishing machine, comprising:
   A. pulse supplying means for supplying pulses having a selected current density between an object to be worked and an electrode, said object and said electrode having thereon respective three-dimensional surfaces of substantially congruent shape which face each other and have therebetween a static electrolyte;
   B. detecting means for detecting the current of the pulses supplied between said electrode and said object to be worked;
   C. control means for setting a lower limit current using the current detected by said detecting means during an initial stage of working and using properties of said object to be worked, comparing said lower limit current with a current detected by said detecting means during working, and controlling said pulse supplying means on the basis of the result of said comparison so that the current density of said pulse increases or decreases during a stage of working subsequent to said initial stage;
   D. positioning means supporting said electrode and said object for movement between positions in which said three-dimensional surfaces thereon are spaced by a first interval and by a second interval greater than said first interval, the spacing between said surfaces being substantially uniform at all locations thereon when said electrode and said object are spaced by said first interval, said pulse supplying means supplying pulses when said spacing between said electrode and said object is said first interval and said positioning means thereafter moving said electrode and said object to effect spacing therebetween of said second interval and then said first interval; and
   E. electrolyte supply means for keeping electrolyte between said electrode and said object static when said pulse supplying means is supplying pulses to said electrode and said object, and for injecting electrolyte between said electrode and said object when said electrode and said object are spaced by said second interval.

3. A method of electro-chemically machining an object using an electrode spaced from said object, comprising the steps of:

providing electrolyte between said electrode and said object;

applying a first pulse between said electrode and said object, and detecting a current flowing between said electrode and said object during said first pulse;

repeating said steps of applying said first pulse until said detected current is less than a predetermined value;

thereafter applying a predetermined number of successive second pulses between said electrode and said object, said second pulses having a current density greater than the current density of said first pulses; and thereafter applying a third pulse between said electrode and said object, said third pulse having a current density less than the current density of said second pulses.

4. A method as recited in claim 3, wherein said step of applying said first pulse includes applying a plurality of said first pulses between said electrode and said object, and said step of applying said third pulses includes applying a plurality of said third pulses between said electrode and said object.

5. A method as recited in claim 4, wherein each said third pulse has a current density substantially equal to that of each said first pulse.

6. A method as recited in claim 4, wherein said step of applying said first pulses includes the step of establishing a predetermined spacing between said electrode and said object, applying a group of said first pulses in succession, thereafter effecting relative movement of said electrode and said object away from each other, thereafter injecting electrolyte between said electrode and said object, and thereafter reestablishing said predetermined spacing between said electrode and said object.

7. A method as recited in claim 6, wherein said steps of establishing said predetermined spacing, applying said group of first pulses, moving said electrode and object away from each other, injecting electrolyte and reestablishing said predetermined spacing are repeated in sequence a predetermined number of times.

8. A method as recited in claim 3, including after said step of applying said third pulse the step of determining whether a predetermined amount of material has been machined from said object, and the step of applying between said electrode and said object a fourth pulse having a current density different from the density of said third pulses in response to determination that said predetermined amount of material has been machined from said object.

9. A method as recited in claim 3, wherein said electrode and said object have respective three-dimensional surfaces thereon which are congruent and which have a substantially uniform spacing at all locations therebetween when said first, second and third pulses are applied between said electrode and said object.

10. A method as recited in claim 3, including prior to said step of applying said first pulse the step of applying a predetermined pulse between said electrode and said object, and determining said predetermined value as a function of a current flowing between said electrode and said object during said predetermined pulse.

* * * * *

UNITED STATES PATENT AND TRADEMARK OFFICE
CERTIFICATE OF CORRECTION

PATENT NO. : 4,956,060

DATED : September 11, 1990

INVENTOR(S) : Yohei KUWABARA et al

It is certified that error appears in the above-identified patent and that said Letters Patent is hereby corrected as shown below:

Column 16, line 53; after "supplying" insert ---said---.

Signed and Sealed this

Seventeenth Day of March, 1992

Attest:

HARRY F. MANBECK, JR.

Attesting Officer

Commissioner of Patents and Trademarks